US012644494B2

(12) United States Patent
Oberdorfer

(10) Patent No.: US 12,644,494 B2
(45) Date of Patent: Jun. 2, 2026

(54) ECCENTRICALLY MOUNTED GUIDE PIN FOR AIR DISC BRAKE SYSTEM AND METHODS FOR THE USE AND ASSEMBLY THEREOF

(71) Applicant: Bendix Commercial Vehicle Systems LLC, Avon, OH (US)

(72) Inventor: Erik W. Oberdorfer, Akron, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 406 days.

(21) Appl. No.: 18/379,571

(22) Filed: Oct. 12, 2023

(65) Prior Publication Data

US 2025/0122913 A1    Apr. 17, 2025

(51) Int. Cl.
F16D 65/00 (2006.01)
F16D 55/00 (2006.01)
F16D 55/2255 (2006.01)
F16D 55/227 (2006.01)
(Continued)

(52) U.S. Cl.
CPC ....... F16D 65/0043 (2013.01); F16D 55/227 (2013.01); F16D 65/0075 (2013.01); F16D 65/0087 (2013.01); *F16D 2055/002* (2013.01); *F16D 55/2255* (2013.01); *F16D 2121/08* (2013.01); *F16D 2125/64* (2013.01)

(58) Field of Classification Search
CPC ........... F16D 55/2265; F16D 55/22655; F16D 55/227; F16D 65/0087
See application file for complete search history.

(56) References Cited

U.S. PATENT DOCUMENTS

| | | | |
|---|---|---|---|
| 5,172,792 A | 12/1992 | Cartwright et al. | |
| 6,540,050 B2 | 4/2003 | Kuroyanagi et al. | |
| 7,037,027 B2 | 5/2006 | Steinbeck | |

(Continued)

FOREIGN PATENT DOCUMENTS

| | | | | |
|---|---|---|---|---|
| CN | 201239882 Y | * | 5/2009 | |
| DE | 3032513 C2 | * | 11/1988 | ......... F16D 65/0979 |

(Continued)

OTHER PUBLICATIONS

C1 MiSUMi, Rough Guide Pins/Eccentric, Sep. 25, 2022, pp. 1-1739-1-1740.

(Continued)

*Primary Examiner* — James J Taylor, II
(74) *Attorney, Agent, or Firm* — Crowell & Moring LLP

(57) ABSTRACT

An air disc brake system includes a carrier having a mounting feature and a guide pin having longitudinally spaced first and second ends, a through hold having a first center axis and an outer cylindrical surface having a second center axis. The first and second axes are spaced apart a distance D such that the outer cylindrical surface and through hole are eccentric. A caliper includes a bore with spaced apart first and second ends. The guide pin is received in the bore, and the caliper is slidably mounted on outer cylindrical surface of the guide pin. A fastener is disposed in the through hole and includes a first end engaged with the mounting feature and a second end engaged with the guide pin. An eccentric guide pin, a tool for adjusting the eccentric guide pin, and methods of using and assembling the air disc brake system are also provided.

16 Claims, 7 Drawing Sheets

(51) Int. Cl.
    *F16D 121/08*     (2012.01)
    *F16D 125/64*     (2012.01)

(56)         References Cited

U.S. PATENT DOCUMENTS

| | | | |
|---|---|---|---|
| 8,540,061 | B1 | 9/2013 | Plantan et al. |
| 9,726,243 | B2 | 8/2017 | Radhakrishnan et al. |
| 10,900,527 | B2 * | 1/2021 | Hacklberger ......... F16D 55/227 |
| 2007/0284198 | A1 * | 12/2007 | Salapic ............. F16D 55/22655 |
| | | | 188/73.45 |
| 2009/0008194 | A1 | 1/2009 | Redemann et al. |
| 2009/0200122 | A1 * | 8/2009 | Bagge ................. F16D 65/0012 |
| | | | 384/192 |
| 2013/0126280 | A1 * | 5/2013 | Gutelius .......... F16D 55/22655 |
| | | | 188/219.1 |
| 2016/0356329 | A1 | 12/2016 | Corcoran et al. |
| 2023/0272830 | A1 | 8/2023 | Oberdorfer |
| 2025/0084904 | A1 * | 3/2025 | Oberdorfer .......... F16D 65/183 |

FOREIGN PATENT DOCUMENTS

| | | | | |
|---|---|---|---|---|
| EP | 2 626 585 | A1 | 8/2013 | |
| JP | 2006-64028 | A | 3/2006 | |
| WO | WO 2009/005623 | A1 | 1/2009 | |
| WO | WO-2017009269 | A1 * | 1/2017 | .......... F16D 55/227 |

OTHER PUBLICATIONS

Bendix Service Data Sheet No. SD-23-7541: Bendix® ADB22X™, ADB22X-V™ Air Disc Brakes; Revision 003; Bendix Spicer Foundation Brake LLC; Aug. 2013; 40 pages.
Bendix Service Data Sheet No. SD-23-7541: Bendix® ADB22X®, ADB22X® -V, and ADB22X® -LT Air Disc Brakes; Revision 012; Bendix Commercial Vehicle Systems LLC; Mar. 2025; 48 pages.
BPW Wheel End product brochure; BPW Group; 2023; 32 pages.
International Search Report and Written Opinion for International Application No. PCT/US2024/049589 mailed Jan. 15, 2025 (11 pages).

* cited by examiner

FIG. 8
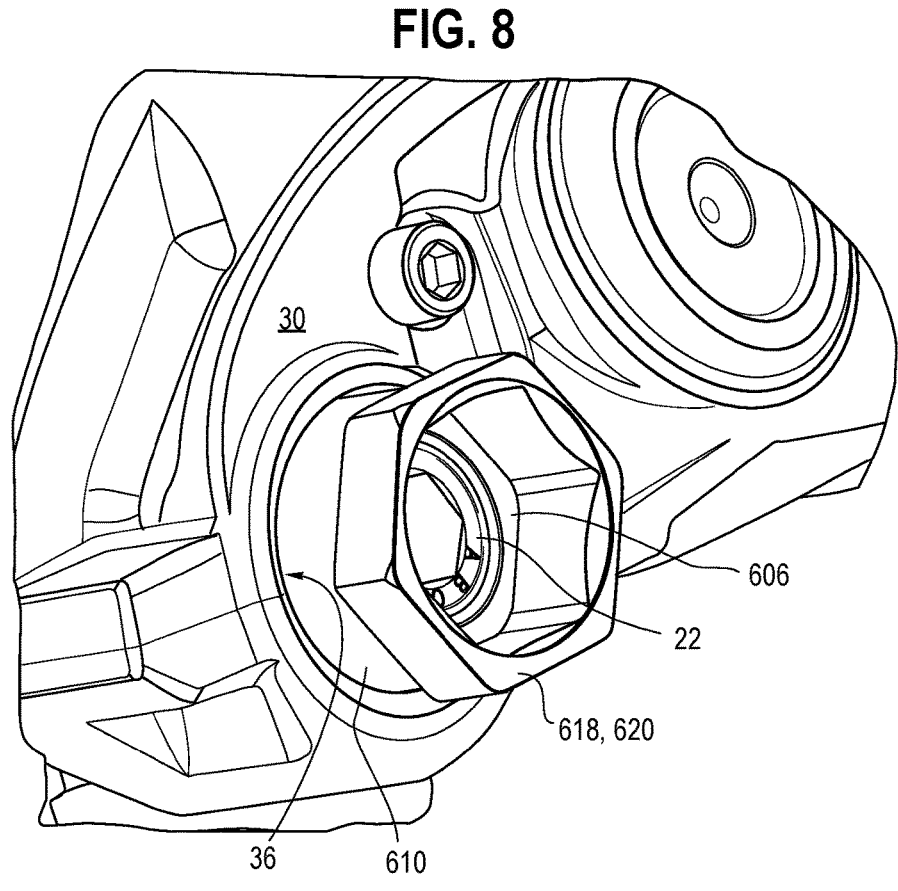
FIG. 9
FIG. 10
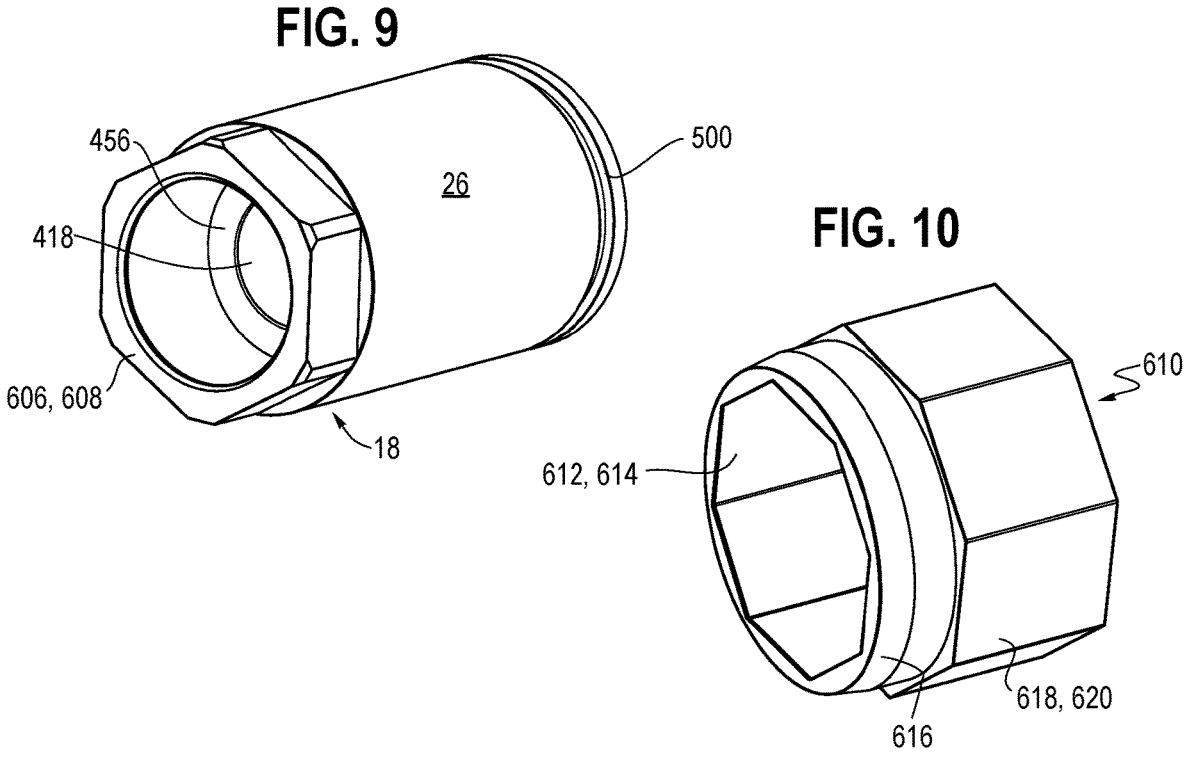

ECCENTRICALLY MOUNTED GUIDE PIN FOR AIR DISC BRAKE SYSTEM AND METHODS FOR THE USE AND ASSEMBLY THEREOF

FIELD OF THE INVENTION

The present application relates generally to an air disc brake system, and in particular to an air disc brake system having an eccentrically mounted guide pin, together with methods for the use and assembly thereof.

BACKGROUND

Air disc brake systems may be configured with opposing pairs of brake pads, with an inner brake pad actuated to engage one side of a brake rotor and an outer brake pad carried by a caliper engaging the other side of the rotor. Brake drag may occur if the caliper fails to completely release the brake pad after an operator releases the brakes. Brake drag may lead to premature wear of the brake pads and/or rotor, and may contribute to overheating and excess wear of various brake components and the resultant damage associated therewith.

In some air disc brake systems, the caliper slides on a pair of guide pins arranged at a fixed distance. During assembly, and due for example to manufacturing tolerances, the distance between the bore holes and/or bolts may vary slightly and/or the overall flex of the carrier may vary, thereby contributing to a greater slide force being applied between one or both of the guide pins and the caliper. This increased slide force may contribute to brake drag and premature wear of the guide pins and/or caliper.

SUMMARY

The present invention is defined by the following claims, and nothing in this section should be considered to be a limitation on those claims.

In one aspect, one embodiment of an air disc brake system includes a carrier having a mounting feature and a guide pin having longitudinally spaced first and second ends, a longitudinally extending through hole having a first center axis and an outer cylindrical surface having a second center axis. The first and second axes are spaced apart a distance D such that the outer cylindrical surface and through hole are eccentric. A caliper includes a longitudinally extending bore having spaced apart first and second ends, wherein the guide pin is received in the bore, and wherein the caliper is slidably mounted on outer cylindrical surface of the guide pin. A fastener is disposed in the through hole and includes a first end engaged with the mounting feature and a second end engaged with the guide pin.

In another aspect, one embodiment of a guide pin includes longitudinally spaced first and second ends, wherein the second end includes a tool engagement feature. A through hole has a first center axis and an outer cylindrical surface has a second center axis. The first and second axes are spaced apart a distance D such that the outer cylindrical surface and through hole are eccentric.

In yet another aspect, one embodiment of a tool for adjusting the eccentricity of a guide pin in an air disc brake system includes an outer cylindrical surface, an interior drive feature configured to be releasably engaged with the guide pin, and a cylindrical end portion having an inner circumferential surface configured to be engageable with an outer cylindrical surface of the guide pin, wherein the cylindrical end portion defines in part the outer cylindrical surface.

In another aspect, one embodiment of a method of adjusting the eccentricity of a guide pin in an air disc brake system includes inserting a fastener into a through hole of a guide pin and threadably engaging a carrier with the fastener, wherein the through hole has a first center axis, slidably inserting an outer cylindrical surface of the guide pin into a bore of a caliper, wherein the outer cylindrical surface has a second center axis, wherein the first and second axes are spaced apart a distance D such that the outer cylindrical surface and through hole are eccentric, rotating the guide pin until the caliper slides easily along the outer cylindrical surface of the guide pin, and tightening the fastener and thereby fixing the rotational position of the guide pin relative to the carrier.

Various other methods of using and assembling the air disc brake system are also provided.

The various embodiments of the air disc brake system and components, and methods for the use and assembly thereof, provide significant advantages over other air disc brake systems and methods. For example, and without limitation, the eccentricity of the guide pin allows the installer to quickly and easily adjust the rotational position of the guide pin relative to the carrier, and thereby reduce the sliding force between the guide pin and carrier. The tool allows the user to engage and rotate the guide pin with little effort before tightening the fastener.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

FIG. 8 is partial perspective view of a tool engaged with an eccentric guide pin disposed in a caliper.

FIG. 9 is a perspective view of one embodiment of an eccentric guide pin.

FIG. 10 is a perspective view of one embodiment of a tool.

DETAILED DESCRIPTION OF THE PRESENTLY PREFERRED EMBODIMENTS

Figure 1:
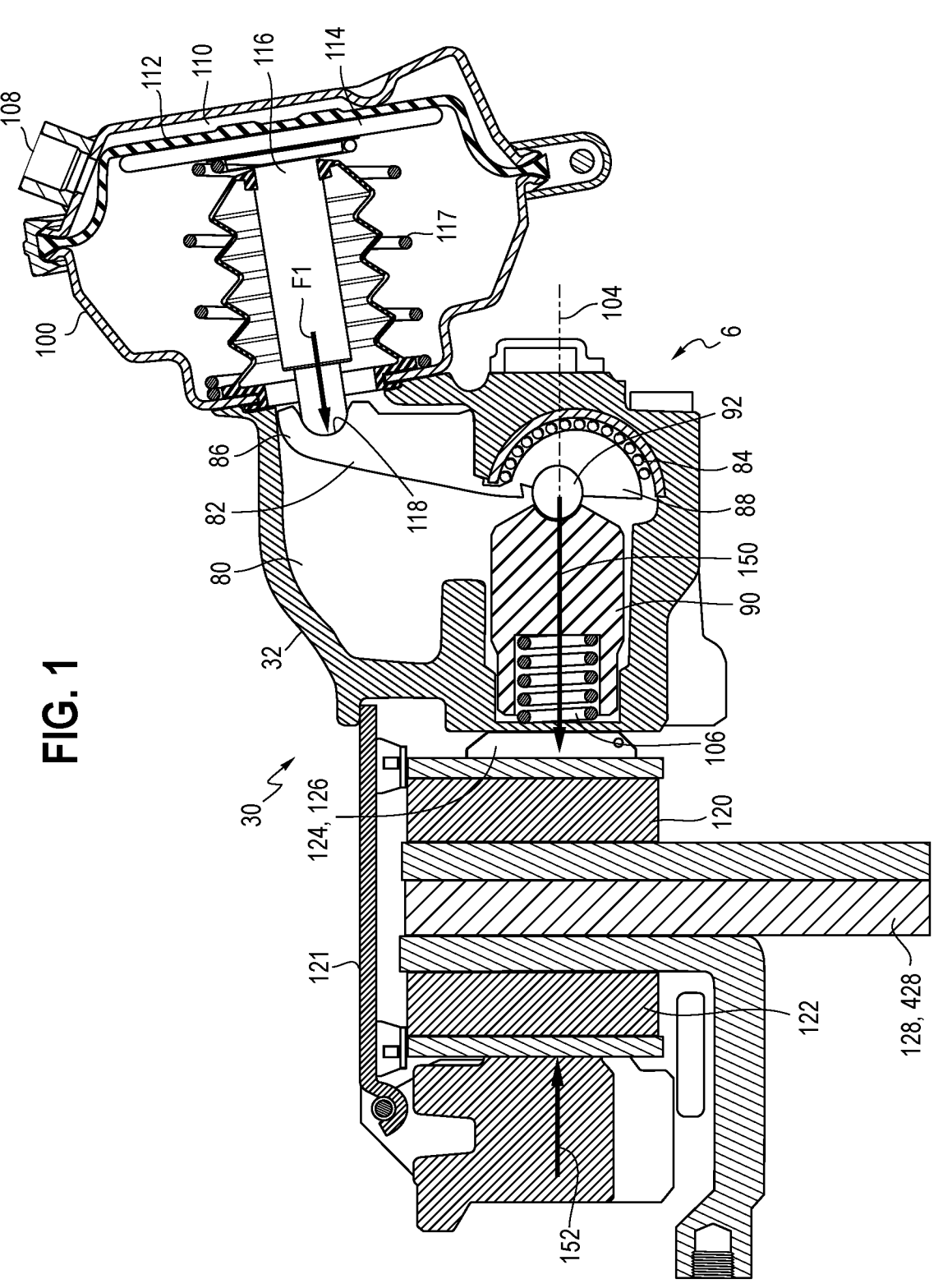
FIG. 1 is a first cross-sectional schematic view of one embodiment of an air disc brake system including an actuator.

It should be understood that the term "plurality," as used herein, means two or more. The term "longitudinal," as used herein means of or relating to a length or lengthwise direction 2, for example a direction running parallel to the axis of a guide pin 18, as shown for example in FIG. 2. The term "lateral," as used herein, means situated on, directed toward or running in a side-to-side direction 4 transverse to the longitudinal direction 2. The term "transverse" means non-parallel. The term "outwardly" refers to a direction facing away from a centralized location, for example the phrase "radially outwardly" refers to a feature diverging away from a centralized location, for example an axis 12 defining a through hole 418 of the guide pin 18. It should be understood that features or components facing or extending "outwardly" do not necessarily originate from the same centralized point, but rather generally emanate outwardly and exteriorly along a non-tangential vector. Conversely, the term "inwardly" refers to a direction facing toward the centralized or interior location.

The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Figure 2:
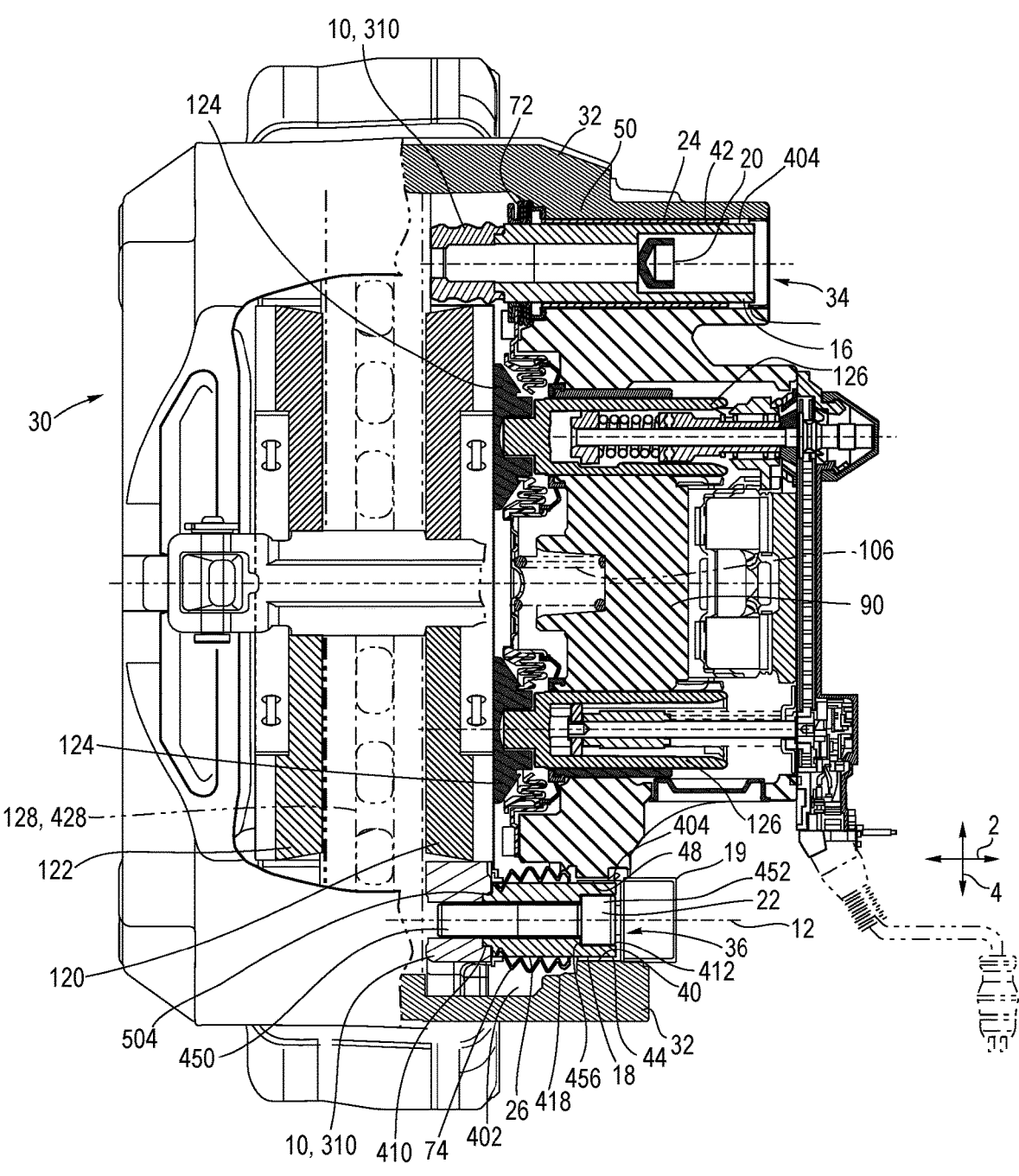
FIG. 2 is a partial cross-sectional view of a guide pin disposed in a caliper with a tool engaged with the guide pin. second cross-sectional view of the air disc brake system.
Figure 4:
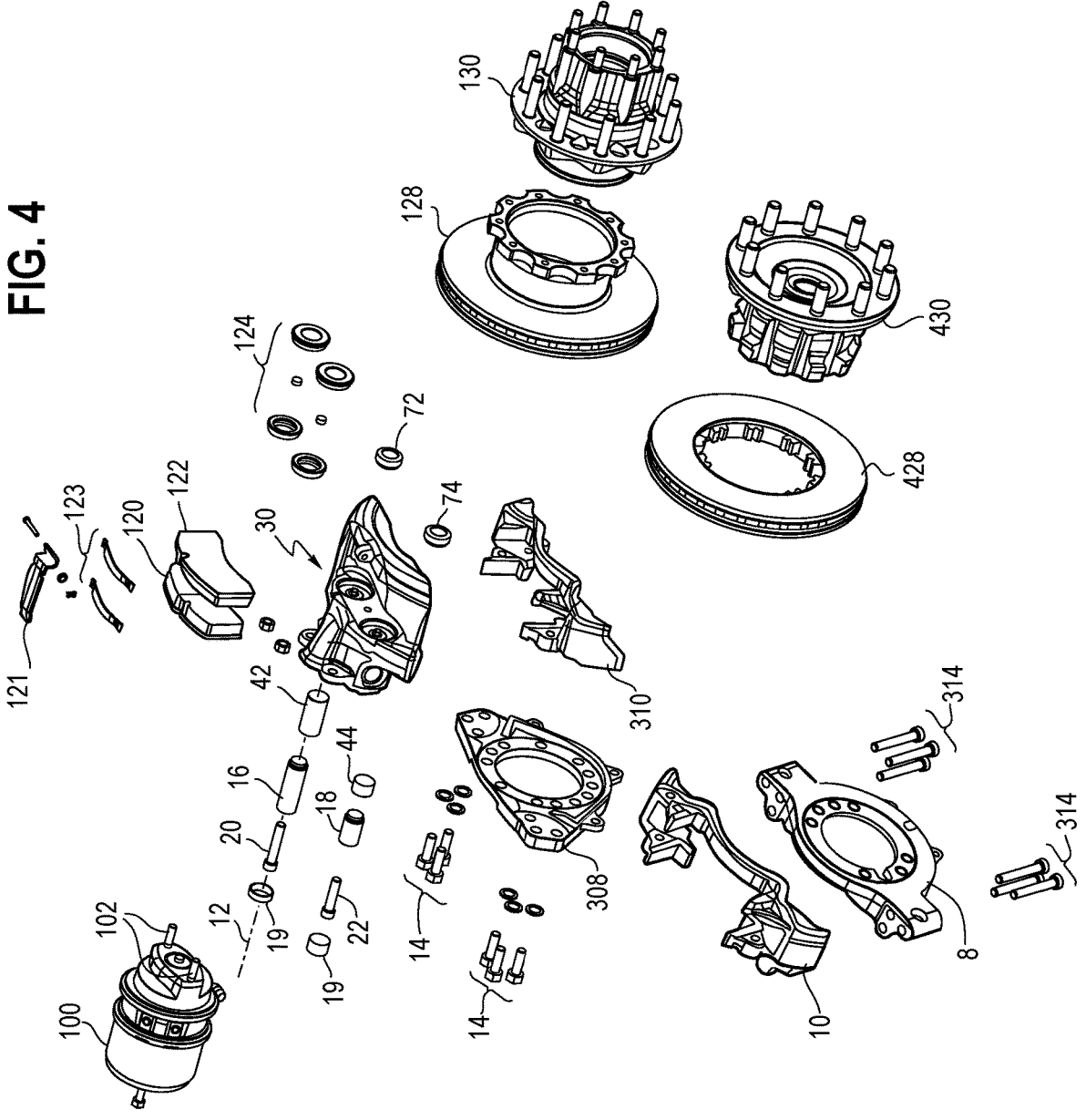
FIG. 4 is an exploded view of one embodiment of an air disc brake system.

Referring to FIGS. 1, 2 and 4, an air disc brake system 6 includes an anchor plate 8, 308 and a carrier 10, 310 connected to the anchor plate, for example with a plurality of fasteners 14, 314, which may include a combination of bolts and washers. The fasteners 14, 314 may be oriented parallel to the axis 12, or perpendicular to the axis 12. A pair of guide pins 16, 18 are mounted, or fastened, to the carrier 10, 310 with fasteners 20, 22, shown as bolts, and extend in the longitudinal direction 2. In one embodiment, a first guide pin 16 has a first length and a second guide pin 18 has a second length, with the first length being greater than the second length. It should be understood that more than two guide pins may be coupled to the carrier. In one embodiment, the guide pins 16, 18 are coupled to the carrier by way of the fasteners 20, 22 through a threadable engagement with the carrier 10, 310 or with nuts positioned on an opposite side of the carrier housing, although the guide pins may be coupled by press fit, welding or other known fastening techniques. Each guide pin 16, 18 has an outer circumferential bearing surface 24, 26. The guide pins may be cylindrical, or may have other shapes, including non-circular cross-sections.

A caliper 30 includes a housing 32 having a pair of bores 34, 36 positioned to receive the guide pins 16, 18 respectively. Each bore has a first and second end 402, 404 and a center axis that may be coaxial and aligned with an axis 604 defined by a cylindrical surface 26 of the guide pin 18. A cap 19 is coupled to close off the second end 404 of the bore 34, 36 and defines a chamber 406 at the second end of the bore. Each bore 34, 36, which are preferably cylindrical but may have other shapes, for example matching the shape of the guide pins 16, 18, has an inner circumferential surface 38, 40 defining a cross sectional area shaped to receive the guide pin 16, 18 and surrounding the outer circumferential surface 24, 26 of the guide pin 16, 18. A bushing 42, 44 is mounted in each bore 34, 36, for example by press fit, with the bushing engaging the inner circumferential surface 38, 40. The bushing 42, 44 defines an inner circumferential surface 46, 48, with the outer circumferential surface 24, 26 of the guide pin 16, 18 slidably engaging the inner circumferential surface 46, 48 of the bushing 42, 44. The bushing 42, 44 may be single bushing, or may be configured with one or more bushings, which may be spaced apart or engaged end-to-end.

A boot seal 72, 74 may be coupled to and disposed between the caliper housing 32 and the guide pin 16, 18. The boot seal 72, 74 may be configured with pleats, allowing the boot seal to expand and contract as the caliper 30 is moved relative to the guide pin 16, 18. The boot seal 72 defines a chamber 408 with the first end 402 of the bore 34, 36.

Figure 5:
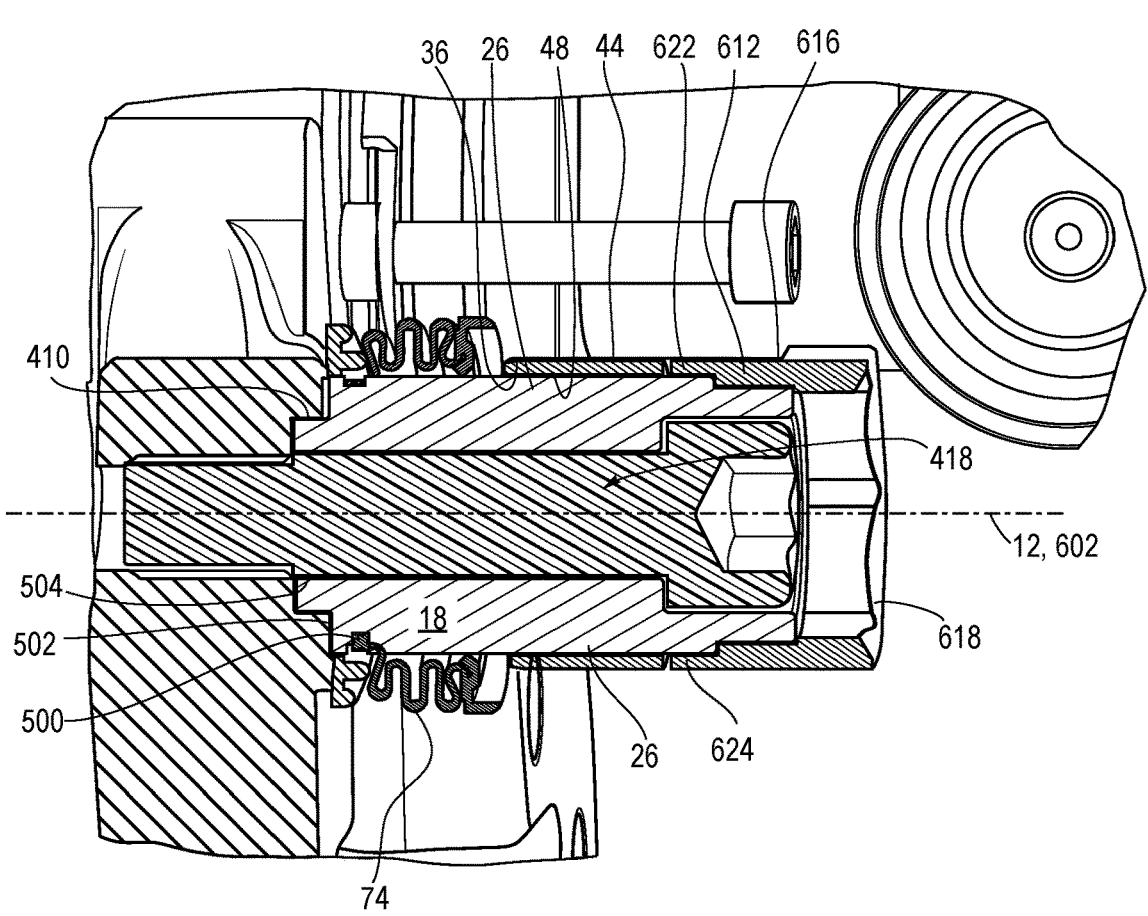
FIG. 5 is an enlarged, partial cross-sectional view of the tool engaging an eccentric guide pin in a caliper.
Figure 6:
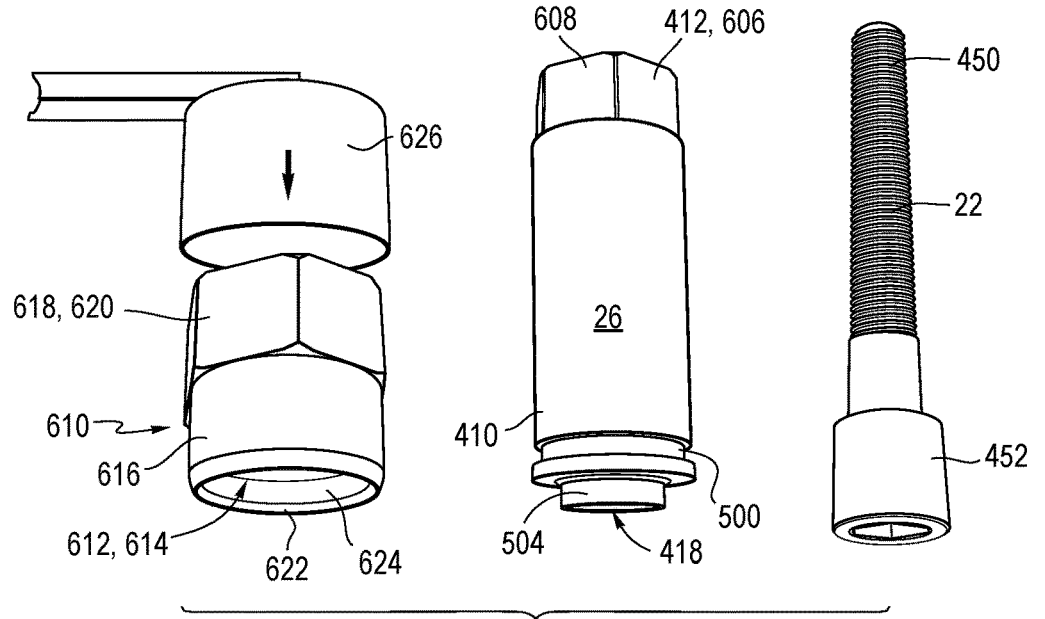
FIG. 6 is a side view of a guide pin kit including an eccentric guide pin, a fastener and a tool.

Referring to FIGS. 5 and 6, the guide pin 18 has longitudinally spaced first and second ends 410, 412, and the interior through hole 418 extending between and open at the first and second ends 410, 412 of the guide pin 18 and defining the center axis 12. An annular groove 500 separates the outer bearing surface 26 and the first end 410 of the guide pin. An end 502 of the boot seal 74 may be disposed in the groove 500 and be trapped therein so as to anchor the boot seal 74. The first end 410 includes a longitudinally extending hub portion 504 having a smaller outer diameter than the diameter of the bearing surface 26.

The guide pin 18 is received in the bore 36 and engages the bushing 44, and the caliper 30, and in particular the caliper housing 32, is thereby slidably mounted on the guide pin 18. The fastener 22 is disposed in the through hole 418 and has a first end 450 engaged with a mounting feature 440 on the carrier 10, 310 and a second end 452 engaged with the guide pin 18. The second end 452 fixes or maintains the position of the guide pin when loaded or torqued. In one embodiment, the first end 450 is threaded and threadably engages a threaded hole defining the mounting feature 440 and having a center axis aligned and coaxial with the axis 12. The second end 452 may be configured as a head of the bolt that engages a shoulder 456. In other embodiments, the second end 452 may engage an end of the guide pin 18. A cap 19 is coupled to the caliper 30, for example by a press or threaded fit with and closing the second end 404 of the bore 36.

Figure 3:
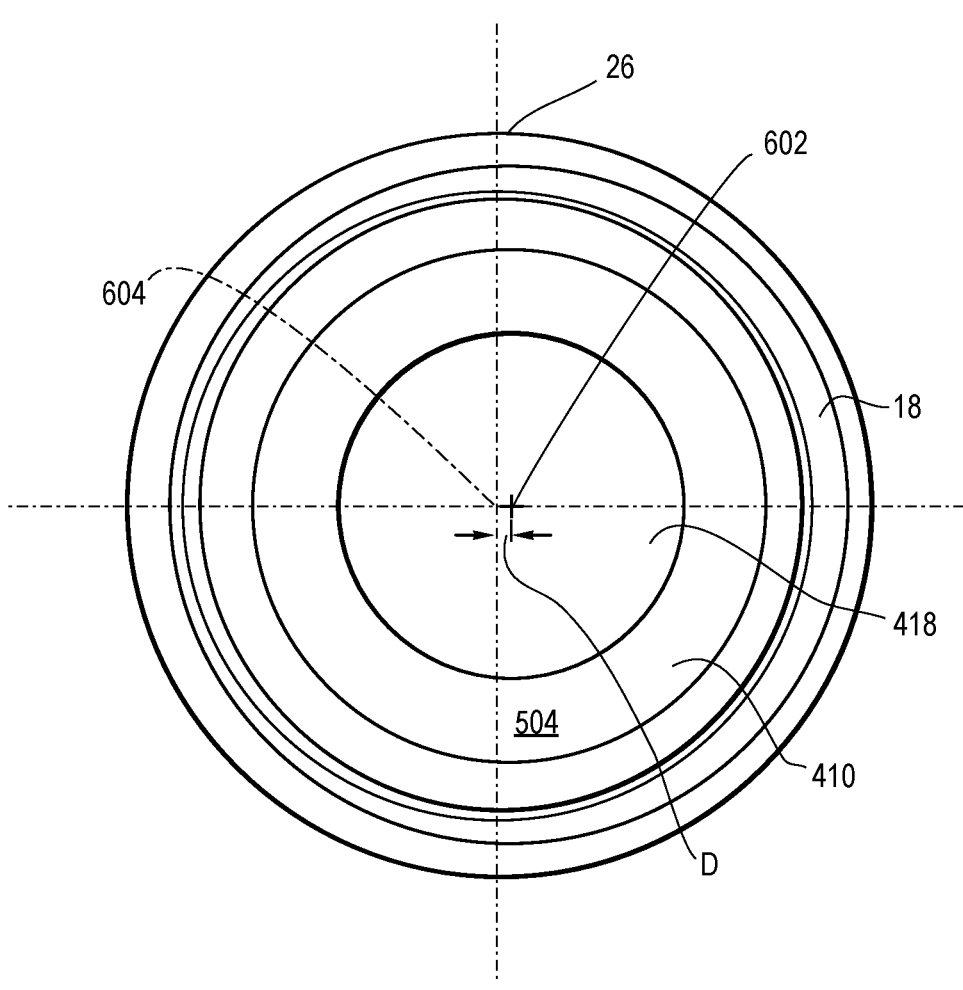
FIG. 3 is an end view of one embodiment of an eccentric guide pin.

Referring to FIG. 3, the through hole 418 has a first center axis 602 and the outer cylindrical surface 26 of the guide pin 18 has a second center axis 604. The first and second axes 602, 604 are spaced apart a distance D such that the outer cylindrical surface 26 and the through hole 418 are non-concentric, or eccentric to each other, meaning the first and second axes 602, 604 are not co-axial but with the through hole 418 contained within the outer cylindrical surface 26. It should be understood that in other embodiments, the guide pin 16 may be eccentric, with a through hole and outer cylindrical surface having spaced apart center axes, or that both of the guide pins 16, 18 may be eccentric. After the guide pin 18 is disposed in the bore 36, which may include the bushing 44, and the fastener 22 is installed in the through hole 418 but not tightened completely, the guide pin 18 is rotatable about the first axis 602, with the cylindrical surface 26 thereby rotating eccentrically about the axis 602. In various embodiments, $0 < D \leq 1$ mm, and in one embodiment, $D = 0.5$ mm. The guide pin 18 may be rotated eccentrically relative to the bore 36, and bushing 44, until the caliper, and the surface 48 of the bushing 44 in particular, slides easily along the outer cylindrical surface 26 of the guide pin 18. Once the optimum position is realized, the fastener 22 maybe tightened to fix the position of the guide pin 18, or fasten the end to the carrier. In one embodiment, the end 452 of the fastener 22 is moveable, e.g., rotatable, between a non-engaged position, wherein the guide pin 18 is rotatable about the center axis 602, and an engaged position, wherein the end 452 of the fastener 22 is engaged with and fixes the position of the guide pin 18 such that the guide pin 18 is non-rotatable about the axis 602. If only a single guide pin is to be made eccentric, or configured with offset axes of the outer surface and through hole, then the "floating" guide pin 18 is typically configured with the eccentricity. If both guide pins 16, 18 are eccentric, the "fixed" guide pin 16 is first adjusted and fixed with the fastener 20, with the floating guide pin 18 thereafter being rotationally adjusted and then fixed with the fastener 22.

Referring to FIGS. 5-9, the first end 410 of the guide pin is mounted, or fastened, to the carrier 10, 310, and the second end 412 includes a tool engagement feature 606. In one embodiment, the tool engagement feature 606 may be configured as an external hex feature 608 with a six sided polygonal shape. It should be understood that tool engagement feature may have any number of external surfaces greater or less than six, including for example four. In other embodiments, the tool engagement feature may be configured as an internal hex (or other polygonal shape) feature, for example surrounding the fastener.

Referring to FIGS. 6 and 10, an adjustment tool 610 includes a drive feature 612, configured in one embodiment as a corresponding internal (or external) hex feature 614 that mates with and releasably engages the tool engagement feature 606. The drive feature 612 may be configured as a socket, with an internal hex feature, that fits over and non-rotatably engages the tool engagement feature 606. The adjustment tool 610 includes an outer circumferential surface 616 insertable into the caliper bore 36. In one embodiment, the adjustment tool 610 includes a second tool engagement feature 618 configured to be engaged by a tool, such as a socket or wrench. In one embodiment, the second tool engagement feature 618 is configured as an external hex feature 620 with a six-sided polygonal shape. It should be understood that tool engagement feature 618 may have any number of external surfaces greater or less than six, including for example four. In other embodiments, the tool engagement feature 618 may be configured as an internal hex (or other polygonal shape) feature In one embodiment shown in FIGS. 5 and 6, the adjustment tool 610 includes a cylindrical end portion 622, which extends longitudinally from the drive feature 612. The end portion 622 has an inner circumferential surface 624 engageable with the outer cylindrical surface 26 of the guide pin 18. In this way, the end portion 622 surrounds and engages the guide pin 18 and holds tool 610 on the guide pin 18 as the tool rotates in the bore. The cylindrical end portion 622 defines in part the outer cylindrical surface 616 of the adjustment tool. The adjustment tool 610, guide pin 18 and fastener 22 make up a guide pin kit.

Figure 7:
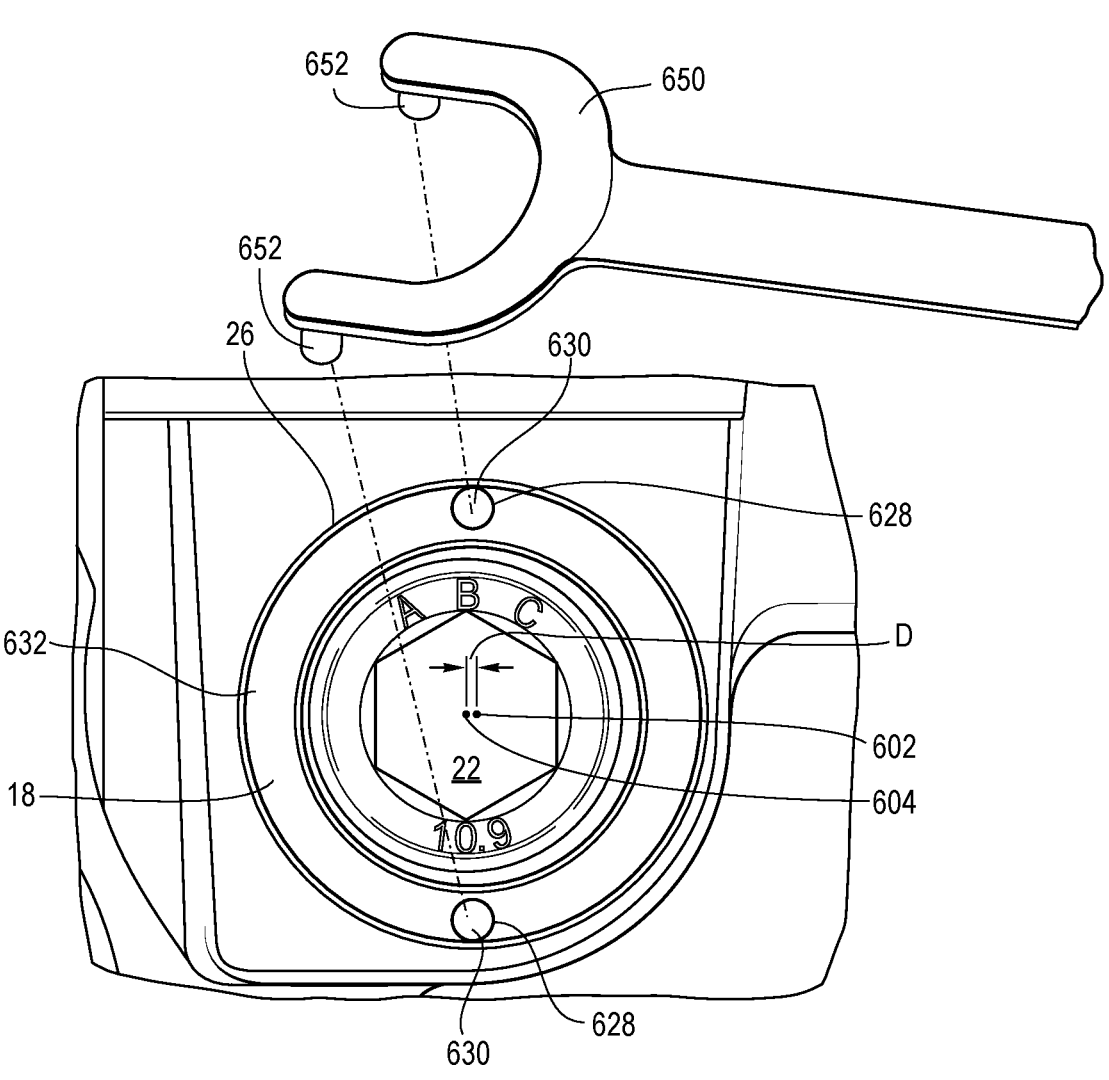
FIG. 7 is an end view of an alternative embodiment of an eccentric guide pin.

In an alternative embodiment, shown in FIG. 7, the tool engagement feature 628 includes a pair of circumferentially spaced openings 630 in an end surface 632 of the guide pin 18. The adjustment tool 650 may be configured as a spanner, with a pair of spaced apart posts 652 or arms that may be releasably engaged with the openings 630 such that the guide pin 18 may be rotated about the axis of the through hole 418 and fastener 22. In any of the embodiments, a guide pin kit may include one or both of the guide pins 16, 18. Alternatively, the guide pin kit may also include one or more of the adjustment tools 610, 650.

In operation, one method of assembling the air disc brake system, and adjusting the eccentricity of the guide pin 18 in the air disc brake system, includes inserting the fastener 22 into the through hole 418 of the guide pin and threadably engaging the carrier 10, 310 with the fastener, wherein the through hole has a center axis 602. The method further includes slidably inserting the outer cylindrical surface of the guide pin 18 into the bore 36 of the caliper, with the outer circumferential surface 26 of the guide pin 18 slidably engaging the inner circumferential surface 48 of the bushing 44. The outer cylindrical surface 26 is defined by the center axis 604, wherein the axes 602, 604 are spaced apart a distance D such that the outer cylindrical surface 26 and through hole 418 are eccentric, or non-concentric. The method further includes rotating the guide pin 18 about the axis 602 of the through hole, and thereby eccentrically rotating the outer cylindrical surface 26 relative to the bore 36, and the inner surface 48 of the bushing 44 in particular, until the caliper slides easily along the outer cylindrical surface 26 of the guide pin. After the ideal rotational position of the guide pin 18 is located, the method further includes tightening the fastener 22 and thereby fixing the rotational position of the guide pin 18 relative to the carrier 10, 310. Rotating the guide pin 18 relative to the bore 36 may be accomplished by engaging the tool engagement feature 606, 628 on the guide pin with an adjustment tool 610, 650, and rotating the adjustment tool 610, 650. Engaging the tool engagement feature with the adjustment tool may include inserting an outer circumferential surface 616 of the adjustment tool into the caliper bore 37 and engaging the tool engagement feature with a drive feature 612 disposed on the adjustment tool. Rotating the guide pin 18 may include engaging a second tool engagement feature 618 on the adjustment tool with a tool 626 and engaging the outer cylindrical surface 26 of the guide pin with an inner surface 624 of a cylindrical end portion of the adjustment tool, wherein the cylindrical end portion defines in part the outer cylindrical surface of the adjustment tool. The method further includes installing the cap 19 on the caliper 30 and closing the second end 404 of the bore 36.

Referring to FIGS. 1, 2 and 4, the caliper housing 32 defines a cavity 80. A lever 82 is disposed in the cavity and is supported by an eccentric bearing 84 disposed in the cavity. The lever 82 has a first portion 86, or arm, extending laterally into the cavity and a second portion 88 engaging a bridge 90, for example through a bearing 92. The first portion 86 is engaged by an actuator 100, which may be mounted to the caliper housing 32 with fasteners 102. The bridge 90 is biased inwardly, away from the brake pads 120, 122 along a longitudinal axis 104 by a return spring 106.

The actuator 100 includes an air supply port 108 in fluid communication with a service brake chamber 110. As air is introduced into the chamber during application of the vehicle brakes, the air applies pressure in the chamber and expands the diaphragm 112 which in turn applies a force to and moves a pressure plate 114 and pushrod 116 in an axial direction. The pushrod 116 engages the first portion 86 of the lever, for example by way of a cup 118 or ball joint, and pushes the lever 82. The lever 82 thereafter rotates and pivots about the eccentric bearing 84 from an unactuated position to an actuated position. As the lever 82 pivots, the second portion 88 of the lever engages and moves the bridge 90 outwardly in the axial direction from a first position to a second position against the force of the return spring 106. The bridge 90 is coupled to and moves a pair of tubes and tappets 124, 126 in the longitudinal direction 2 so as to move an inner brake pad 120 in the longitudinal direction. In other embodiments, a single tube and tappet may be used to move the inner brake pad in the longitudinal direction. The inner brake pad 120 engages the brake rotor 128, 428. Further movement of the bridge 90 forces the caliper 30, sliding on the guide pins 16, 18, away from the rotor 128, 428 in the longitudinal direction 2 from a non-braking position to a braking position. The sliding movement of the caliper 30 on the guide pins 16, 18 moves the outer brake pad 122 inwardly toward an opposite side of the rotor 128, thereby clamping the rotor 128, 428 between the inner and outer brake pads 120, 122 and applying a braking force to the brake rotor 128, 428 and attached hubs 130, 430. The brake pads 120, 122 are coupled to the carrier and caliper with a pad retainer 121 and springs 123.

When the vehicle brakes are released, the air pressure in the service brake chamber 110 is exhausted and the return springs 117, 106 in the chamber and in the cavity acting on the bridge 90 return the air disc brake to a neutral, non-braked position. To maintain an appropriate running clearance gap between the rotor 128, 428 and the brake pads 120, 122 over time, the non-braked position may be mechanically adjusted by a mechanism in the caliper. The adjustment mechanism operates automatically whenever the brakes are activated, to compensate for rotor and brake pad wear and to keep the running clearance constant.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. An air disc brake system comprising:
   a carrier having a mounting feature;
   a guide pin comprising:
      longitudinally spaced first and second ends;
      a longitudinally extending through hole having a first center axis; and
      an outer cylindrical surface having a second center axis wherein the first and second axes are spaced apart a distance D such that the outer cylindrical surface and through hole are eccentric;
   a caliper comprising a longitudinally extending bore having spaced apart first and second ends, wherein the guide pin is received in the bore, and wherein the caliper is slidably mounted on the outer cylindrical surface of the guide pin; and
   a fastener disposed in the through hole and comprising a first end engageable with the mounting feature and a second end moveable between a non-engaged position, wherein the guide pin is rotatable about the first center axis, and an engaged position, wherein the fastener is engaged with and fixes the position of the guide pin such that the guide pin is non-rotatable about the first center axis;
   wherein an adjustment tool comprises an outer circumferential surface insertable into the caliper bore and a drive feature releasably engageable with a tool engagement feature.

2. The air disc brake system of claim 1 wherein the mounting feature of the carrier defines a third center axis coaxial with the first center axis and the bore defines a fourth center axis coaxial with the second center axis.

3. The air disc brake system of claim 1 wherein the guide pin is rotatable about the first axis in the non-engaged position such that the outer cylindrical surface is eccentrically rotatable about the second axis relative to the caliper bore.

4. The air disc brake system of claim 1 wherein 0.5 mm≤D≤1 mm.

5. The air disc brake system of claim 4 wherein D=0.5 mm.

6. The air disc brake system of claim 1 wherein the first end of the guide pin is fastened to the carrier when the fastener is moved to the engaged position, and wherein the second end comprises the tool engagement feature.

7. The air disc brake system of claim 6 wherein the tool engagement feature comprises a hex feature.

8. The air disc brake system of claim 6 wherein the tool engagement feature comprises a pair of circumferentially spaced holes.

9. The air disc brake system of claim 1 wherein the adjustment tool comprises a second tool engagement feature configured to be engaged by a tool.

10. The air disc brake system of claim 1 wherein the adjustment tool comprises a cylindrical end portion having an inner circumferential surface engageable with the outer cylindrical surface of the guide pin, and wherein the cylindrical end portion defines in part the outer circumferential surface of the adjustment tool.

11. The air disc brake system of claim 10 wherein the cylindrical end portion extends longitudinally from the drive feature.

12. A method of adjusting the eccentricity of a guide pin in an air disc brake system comprising:
   inserting a fastener into a through hole of the guide pin having a first center axis;
   slidably inserting an outer cylindrical surface of the guide pin into a bore of a caliper, wherein the outer cylindrical surface comprises a second center axis, wherein the first and second axes are spaced apart a distance D such that the outer cylindrical surface and through hole are eccentric;
   threadably engaging a carrier with the fastener;
   rotating the guide pin until the caliper slides easily along the outer cylindrical surface of the guide pin; and
   tightening the fastener and thereby fixing the rotational position of the guide pin relative to the carrier;
   wherein rotating the guide pin comprises engaging a tool engagement feature on the guide pin with an adjustment tool, and rotating the adjustment tool.

13. The method of claim 12 wherein 0.5 mm≤D≤1 mm.

14. The method of claim 12 wherein the tool engagement feature comprises a hex feature.

15. The method of claim 12 wherein the tool engagement feature comprises a pair of circumferentially spaced holes.

16. The method of claim 12 wherein engaging the tool engagement feature with the adjustment tool comprises inserting an outer circumferential surface of the adjustment tool into the caliper bore and engaging the tool engagement feature with a drive feature disposed on the adjustment tool.

* * * * *